United States Patent [19]

Didier

[11] Patent Number: 4,586,774
[45] Date of Patent: May 6, 1986

[54] ELECTRICAL CONNECTOR FOR ARMORED CABLES

[75] Inventor: Robert G. Didier, Santa Rosa, Calif.

[73] Assignee: BIW Cable Systems, Inc., Boston, Mass.

[21] Appl. No.: 602,767

[22] Filed: Apr. 23, 1984

[51] Int. Cl.[4] .......................................... H01R 13/52
[52] U.S. Cl. .................................. 339/94 M; 339/205
[58] Field of Search ................ 339/59 R, 59 M, 60 R, 339/60 C, 60 M, 94 R, 94 A, 94 C, 94 M, 204, 205, 136 R, 136 M, 141, 138; 174/92

[56] References Cited

U.S. PATENT DOCUMENTS

| 2,626,299 | 1/1953 | Richards | 339/205 |
| 3,314,041 | 4/1967 | Potterin | 339/205 |
| 3,879,659 | 4/1975 | Lawson, Jr. | 324/52 |
| 3,936,590 | 2/1976 | Albano | 174/92 |
| 3,945,700 | 3/1976 | Didier | 339/59 M |
| 3,992,569 | 11/1976 | Hankins et al. | 174/92 |
| 4,073,559 | 2/1978 | Lawson, Jr. | 339/94 R |

OTHER PUBLICATIONS

BIW Cable Systems, Inc., Assembly Instruction Manual No's. A400-0007 and A400-0014, Jan. 1983.

Primary Examiner—John McQuade
Attorney, Agent, or Firm—Kenway & Jenney

[57] ABSTRACT

A field-attachable electrical connector splices the conductors of two armored cables without hand soldering. The connector has a rigid hollow housing with axial passages at both ends that receive and locate the cables. Insulating end supports locate and seal the conductors projecting from the outer armor jacket. A sealing connector, also formed of an insulating material, bridges the end supports and surrounds the stripped ends of the conductors of both cables and a pin contact secured on each conductor's end. A locking contact socket member with two axially oriented oppositely directed sockets is secured in a passage of the seal connector between a pair of the stripped ends. A spring clip carried on the pin contact mates with a recess in the socket connector to secure each pin contact in a reliable electrical connection within an associated socket. Each socket connector has a gas impermeable wall between its two sockets. The housing has a compact cross-sectional profile and is configured internally to be in a close-fitting relationship with the end supports and the sealing connection between the end supports.

8 Claims, 4 Drawing Figures

ELECTRICAL CONNECTOR FOR ARMORED CABLES

BACKGROUND OF THE INVENTION

This invention relates in general to electrical connectors. More specifically, it relates to a field attachable connector for use down-hole in oil wells.

Electrical connectors for armored cables are particularly important in the production of oil. Submersible pumps are widely used in oil wells to extract the maximum volume of oil from the well site. Such pumps rest in the oil at the bottom of the well. Armored cables conduct electrical power from ground level to the pump. A typical cable has multiple conductors, each with their own insulation, surrounded by further insulation and an outer metallic jacket. The conductors are capable of carrying current at high power levels and at high voltages, for example, 2,400 volts. The armor jacket and heavy insulation are necessary to protect the conductors from both mechanical damage and the corrosive or explosive capabilities of fluids in the well such as liquid oil or water and flammable hydrocarbon gases that are often under very high pressures—several thousand pounds per square inch (psi).

In the past, during the installation of a submersible pump, the cable was introduced into the well in one continuous length strapped to the outside of a production tube used to conduct the oil to the surface. The straps were spaced at intervals to secure and control tension in the cable. The cable was simply pushed through the wellhead and then terminated in an electrical junction box. With this system, the principal use for splicing of the cable in the field was to repair mechanical damage to the cable.

Modern practice is to make electrical cable connection at the wellhead and between cable segments in down-hole packers (inflatable wellheads located down in the well casing). There is therefore a need to make an electrical connection (a splice) between the conductors of cable segments at a down-hole location. Because there has been a large growth in the use of submersible pumps, and because other components of the pump system have become more reliable (e.g. the cable, connectors, and pump motors), cable splices done in the field, typically by hand soldering, have become the weak link in the reliability of the entire pump system. Besides being unreliable, hand-splicing is also a comparatively time consuming and skilled procedure.

While connectors for armored cable are known, as for example the connector described in U.S. Pat. No. 3,945,700, they are not suited for splicing together the ends of two armored cables. Rather, they are designed primarily to connect the cable and its conductors to a socket of a conventional feed-through. As one example, the connector of the U.S. Pat. No. 3,945,700, which is commonly assigned with the present application, is designed to secure the conductor to female contactor tubes that mate with contact pins in the feed-through socket. A threaded coupling ring rotatably mounted on the outside of the connector mechanically secures the connector to the feed-through socket. Because of this coupling arrangement, the connector must have a round cross-section. This is a significant disadvantage for a down-hole connector because it should fit in all standard size casings; this requires that the connector have a much lower profile than that offered by conventional round connectors.

Another difficulty with the U.S. Pat. No. 3,945,700 connector is that while it can be designed to accept cables with either a flat or round cross-sectional configuration, it does not provide a direct connection to another such cable, let alone one that may have a different configuration.

Because a down-hole connector operates in a hostile environment that may include a combustible gas under high pressure and fluids that can adversely affect the components of the cables, it must also protect the electrical components from the fluids and ensure that arcs or electrical resistance heating do not lead to an explosion or fire. While the U.S. Pat. No. 3,945,700 connector is sealed and in general designed to be explosion resistant, the rotating coupling ring may be susceptible to leaks where there are rapid fluctuations in pressure or temperature or when there is an aging of the sealing and mounting elements.

The U.S. Pat. No. 3,945,700 connector is also a comparatively complex structure with attendant disadvantages in its cost of manufacture. For example, the housing contains three molded rubber components, one metallic ring, and multiple contactor tube assemblies in electrical connection with the conductors. Mechanical connection of the connector to another element such as a socket requires a coupling sleeve and a coupling ring located principally at the exterior of the connector.

U.S. Pat. No. 4,073,559 to Lawson describes another connector for use down-hole in oil wells. It has tubular shells that are clamped together by a rotatable threaded sleeve 12. The connector is sealed by a lead washer that is pressed between the opposite end faces of the shells. Like the U.S. Pat. No. 3,945,700 connector discussed above, the Lawson U.S. Pat. No. 4,073,559 connector has a round cross-section that is not conducive to down-hole use and the sealing arrangement is not a reliable safeguard against the passage of explosive gases and corrosive fluids, especially under the aforementioned hostile operating conditions.

It is therefore a principal object of this invention to provide an electrical connector that can reliably splice together two armored electrical cables.

Another principal object of this invention is to provide such a splice connector which has a low profile and is designed to operate in an environment of high pressure fluids and gases, including combustible gases, so that it can be used for down-hole splicing in any standard size oil well casing.

Yet another object is to provide a connector with the foregoing advantages that can splice any combination of flat or round cables.

A further object is to provide a connector with the foregoing advantages that is field-attachable in a short period of time by comparatively unskilled workers using no special tools, tapes, fabrication, or soldering.

A still further object is to provide a connector with the foregoing advantages that has a long performance life despite operation in a hostile fluid environment.

SUMMARY OF THE INVENTION

An electrical connector suitable for making a down-hole splice between armored cables in an oil well casing has a hollow outer housing formed of a rigid structural material such as heavy steel. Passages formed at opposite ends of the housing closely surround and locate the armored ends of the cables. The housing thus extends between and is axially aligned with the cables. The cross-sectional shape of the housing has a low-height profile with the conductors arrayed generally side-by-side within the housing. Insulating end supports located adjacent to the locating passages surround each of the conductors or their insulation. Preferably the end supports are sealed to the insulation surrounding each conductor.

A seal connector, preferably formed from molded rubber, bridges the end supports. The seal connector and the end supports are in a close-fitting relationship with the surrounding interior surfaces of the housing. The conductors each have free ends that are stripped of insulation. These free ends are received axially into passages that extend through the seal connector, again in a close-fitting relationship.

A locking socket contact is mounted within each seal connector passage. Each socket contact has two axially directed, open sockets separated by a gas impermeable wall. Each socket receives and makes a reliable electrical connection with the end of one of the conductors, or in the preferred form, with a pin contact secured on the end of the conductor, providing that the conductor end or the pin contact is fully seated in the socket.

A spring clip mounted on the pin contact, or an equivalent mechanical retention arrangement, locks the pin contact in the fully seated position in the socket. The spring clip preferably has resilient leaf spring skirt portions that snap into a locking relationship with a mating recess formed on the interior surface of each socket.

These and other features and objects of the present invention will be more fully understood from the following detailed description which should be read in light of the accompanying drawings.

DETAILED DESCRIPTION OF THE DRAWINGS

DETAILED DESCRIPTION OF THE PREFERRED EMBODIMENTS

Figure 1:
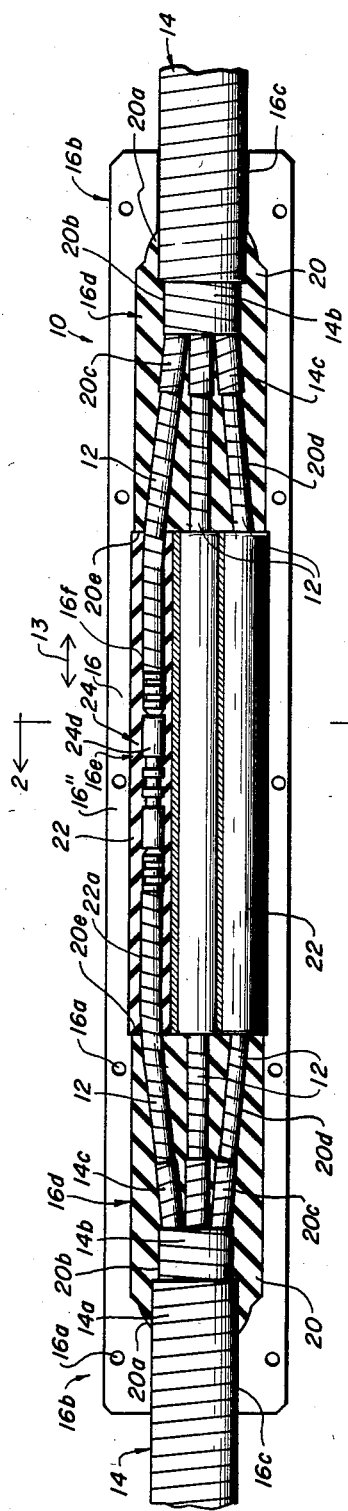
FIG. 1 is a top plan view partly in horizontal section of a down-hole cable splice connector according to the present invention for two cables having a "flat" configuration and each carrying three conductors.
Figure 4:
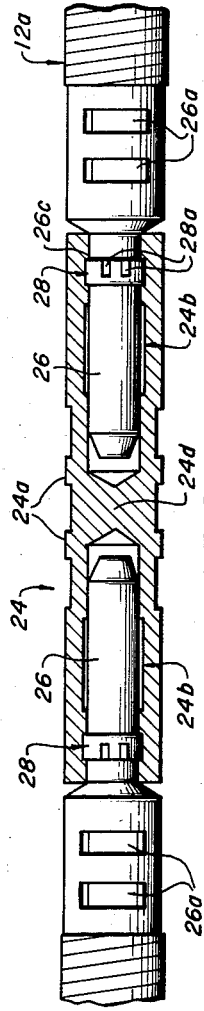
FIG. 4 is a detailed view of the locking socket contact and pin contacts shown in FIG. 1.

FIG. 1 shows an electrical connector 10 according to the present invention which splices together in a reliable electrical connection the conductors 12,12,12 of two armored cables 14,14 of conventional construction. The cables and the connector 10 are shown extending in a direction 13 which will be referred to herein as "axial." As shown, the cables 14,14 have a "flat" configuration with their associated conductors in a generally side-by-side array within the cables. While this invention will be described with respect to a connector that splices two flat cables, it will be understood that the connector 10 can readily be adapted to accept round cables at one or both ends. Thus the connector can splice any combination of standard round or flat armored cables. Also, while the present invention will be described with respect to an aromored cable with a metallic outer jacket and with respect to a connector that is particularly adapted for down-hole splices in an oil well casing (e.g. at a packer), it will be understood that the connector 10 can be used on other types of multiple conductor, shielded cables and in other operating environments.

The connector 10 has a hollow housing 16 formed from an upper and lower halves 16' and 16" clamped together at their mating edges by screws 18 received in threaded openings 16a. The housing is formed of a material that is substantially impermeable to gases, even those at very high pressures, is highly corrosion resistant, and has a high tensile strength. A thick steel housing is preferred. Each end 16b,16b of the housing has an axially oriented passage 16c that receives one of the armored cables 14 in a close fitting relationship. This passage provides a "built-in" guide that locates and orients the cable end secured in the connector 10.

Adjacent the passages 16c,16c are mirror image end sections 16d,16d each filled with a resilient insulating "end" support member 20 preferably formed of molded rubber. The adjacent interior surfaces of the housing sections 16d,16d are in a close-fitting relationship with the support members 20,20. Within each member 20, the outer metallic jacket 14a of the armored cable 14 terminates and is received in a mating recess 20a that is axially aligned with the associated passage 16c. An intermediate insulating layer 14b is similarly terminated and received in a recess 20b of the support member. Passages 20c, 20c,20c receive and separate the individual conductors 12,12,12. The passages 20c lead to aligned passages 20d having a reduced diameter adapted to receive the conductors 12 stripped of their immediately surrounding insulation 14c.

At each of the interior recesses and passages of the support members 20,20, the components of the cable 14 are held in a close-fitting relationship to minimize the free volumes within the connector and to block any fluid flow through the support member. Preferably the sealing function of the support member 20 is enhanced by adhering the exposed insulation layers 14c to the surrounding walls of the passages 20c. Suitable procedures for preparing, securing and adhering the cable 14 and its components in the rubber support member 20 are the same as those currently in use in connection with field attachable connectors of BIW Cable Systems, Inc. for its connectors described in the aforementioned U.S. Pat. No. 4,945,700. These procedures are also described in BIW Manual Nos. A 400-0007 and A 400-0014 for flat and round cables, respectively.

As the conductors leave the facing ends 20e,20e of the support members, they immediately enter the axially oriented interior passages 22a of a seal connector 22 that bridges the gap in a central housing section 16e between the two end support members 20,20. The seal connector is also formed of a resilient insulating material, preferably molded rubber. At their exterior surfaces, the seal connector 22 is in a close-fitting relationship with mating curved surfaces 16f formed on the interior of the central section 16e of the housing. At their interior surfaces, the passages 22a, 22a, 22a of the seal connector each hold a locking socket contact 24. Preferably the socket contact 24 is molded in place at the center of each passage 22a. Circumferential ridges 24a on the outer surface of the socket contact secure it against axial movement with respect to the seal connector. The other interior surface of the seal connector passages are in a close-fitting relationship with the conductors and pin contacts 26 crimped at 26a,26a to a free, stripped end 12a of each conductor.

The pin contacts 26 are sized to establish a reliable electrical connection with an associated socket 24b of the socket contact 24 when the pin contact is fully inserted into the socket, as shown in FIG. 1. This "fully seated" or "locked" position is secured by a spring clip 28 carried on the outer surface of each pin contact. The spring clip has a set of skirt sections 28a that act as leaf springs. When the pin contact is fully seated, their inherent spring force snaps them into a mating and locking engagement with a recess 26c formed on the interior surface of each socket. The abutting relationship between the rear edge of the clip 28 and the recess 26c holds the associated conductor 12 and its pin contact 26 in the fully seated position. Each conductor is thus secured in electrical connection with a corresponding conductor of another cable via the socket contact 24 without hand soldering.

The socket contact includes a central transverse, wall 24d that separates the two oppositely directed sockets 24c of each socket contact. The wall 24d provides a gas impermeable barrier that prevent an axial gas flow through the socket contact.

Figure 2:
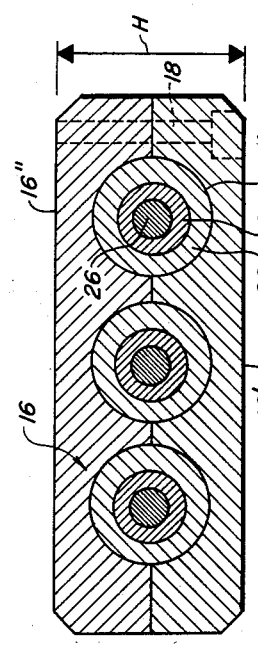
FIG. 2 is a view taken along the line 2—2 in FIG. 1 showing the cross section of the connector at its central portion.

FIG. 2 demonstrates the low-height profile of the connector 10. The conductors are arrayed in a common plane and the height H of the housing is determined by the diameter of a conductor 12, that of the seal connector 22, and the necessary thickness of the housing to provide a desired level of structural strength. As shown, the overall height of the connector 10 has a maximum value approximately three times the diameter of a conductor stripped of its insulating layer 14c. A typical value for H is 1 and $\frac{1}{8}$ inch.

Figure 3:
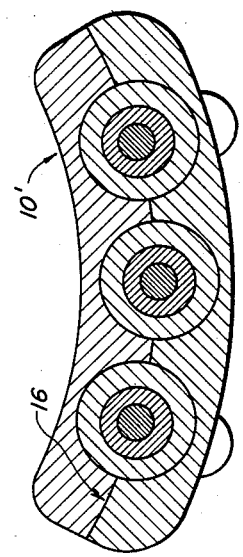
FIG. 3 is a view corresponding to FIG. 2 showing an alternative, curved housing profile for the connector of FIGS. 1 and 2.

FIG. 3 shows an alternative connector 10' which is identical to the connector 10 of FIGS. 1 and 2 except that the housing is curved along a generally circular arc when viewed on end. This configuration is useful where the connector is secured to the curved surface of tubing used in oil wells.

While the invention has been described with respect to its preferred embodiments, it should be understood that various modifications and alterations will occur to those skilled in the art. For example, the pin contacts can be secured in the sockets using a resilient leaf spring mounted on the interior of the socket 24 to mate with a recess on the pin contact 26. A variety of other retention arrangements could also be used. Similarly, while the invention has been described with respect to a set of mold rubber members 20 and 22 that substantially fill the interior of the housing 16, the number, configuration and other characteristics of these bodies can be accomplished using a wide variety of other elements. All such modifications and variations are intended to fall within the scope of the appended claims.

What is claimed is:

1. An electrical connector that establishes a reliable electrical connection between two armored cables that each carry multiple conductors, said connector being suitable for operation in an environment of combustible and corrosive fluids under high pressure, comprising:

an elongated hollow housing formed of a rigid structural material that is located between and axially aligned with the cables, a pair of insulating bodies that each surround the portion of one of said cables that projects into said housing, said insulating bodies each having a plurality of internal passages arrayed in a side-by-side fashion and which each receive and closely surround one of said conductors, insulating means formed of a resilient material disposed in abutting relationship between said pair of insulating bodies, said insulating means locating a stripped end of each of the conductors within a central portion of said housing with associated pairs of the conductors of each of the armored cables disposed in a generally axially aligned array, electrical socket contacts secured within said insulating means, said socket contacts each having oppositely facing electrical connecting recesses that receive the stripped free ends of one axially aligned pair of the conductors and have a wall intermediate said recesses that is impermeable to an axial flow of fluids therethrough, said insulating means being in a close-abutting relationship with said conductors and said socket contacts to provide a fluid seal therebetween and maintaining said side-by-side array of said conductors, means for permanently mechanically securing each of the stripped conductor ends in a reliable electrical connection with an associated one of said socket contacts, and adhesive means for sealing said insulating bodies to said conductors, said housing having internal cavities configured to surround said pair of insulating bodies and said insulating means closely to eliminate open cavities within said housing, and said housing being non-cylindrical and having a low maximum height.

2. The connector of claim 1 further comprising a pin contact secured to each of the stripped conductor ends, said pin contacts each being received in an axially oriented socket of said socket contacts to establish a reliable electrical connection between said socket contact and the stripped free end when said pin contact is fully seated within said socket.

3. The connector of claim 1 wherein said securing means comprises a spring clip carried on the stripped end and a mating locking recess formed in each of said socket contacts and positioned axially to secure the free end in said reliable electrical connection in an associated one of said socket contacts.

4. The connector of claim 2 wherein said securing means comprises a spring clip carried on said pin contact and a mating locking recess formed in each of said sockets and positioned axially to secure said pin contact in said reliable electrical connection in an associated one of said sockets.

5. The connector of claim 1 wherein said housing includes means for guiding the ends of the armored cables into said housing.

6. The connector of claim 1 wherein said member is formed of molded rubber.

7. The connector of claim 1 wherein the conductors lie generally in a common horizontal plane.

8. The connector of claim 1 wherein the conductors are positioned in a curved relationship to each other and said housing has a corresponding curved cross-sectional configuration.

* * * * *